(12) United States Patent
Rankin et al.

(10) Patent No.: US 7,486,685 B2
(45) Date of Patent: Feb. 3, 2009

(54) SYSTEM FOR SHARING CHANNELS BY INTERLEAVING FLITS

(76) Inventors: Linda J. Rankin, 2362 SW. Madison St., Portland, OR (US) 97205; Suresh Chittor, 8040 SW. 154 Ave., Beaverton, OR (US) 97007

( * ) Notice: Subject to any disclaimer, the term of this patent is extended or adjusted under 35 U.S.C. 154(b) by 736 days.

(21) Appl. No.: 09/894,136

(22) Filed: Jun. 29, 2001

(65) Prior Publication Data

US 2003/0002493 A1 Jan. 2, 2003

(51) Int. Cl.
*H04L 12/56* (2006.01)
*H04J 3/22* (2006.01)

(52) U.S. Cl. ............... 370/412; 370/419; 370/465

(58) Field of Classification Search ......... 370/464–466, 370/535–545, 412–419, 216–228; 709/208–209, 709/229, 232, 255
See application file for complete search history.

(56) References Cited

U.S. PATENT DOCUMENTS

| | | | | |
|---|---|---|---|---|
| 4,748,560 | A * | 5/1988 | Kataoka | 710/107 |
| 5,001,472 | A * | 3/1991 | Fischer et al. | 370/455 |
| 5,329,521 | A * | 7/1994 | Walsh et al. | 370/225 |
| 5,406,607 | A * | 4/1995 | Marietta | 377/64 |
| 5,517,495 | A * | 5/1996 | Lund et al. | 370/399 |
| 5,748,893 | A * | 5/1998 | Hirata et al. | 709/200 |
| 5,999,534 | A * | 12/1999 | Kim | 370/395.42 |
| 6,009,488 | A | 12/1999 | Kavipurapu | |
| 6,269,126 | B1 * | 7/2001 | Toskala et al. | 375/265 |
| 6,285,679 | B1 * | 9/2001 | Dally et al. | 370/413 |
| 6,459,698 | B1 * | 10/2002 | Acharya | 370/392 |
| 6,563,831 | B1 * | 5/2003 | Dally et al. | 370/401 |
| 6,628,615 | B1 * | 9/2003 | Joseph et al. | 370/231 |
| 6,707,806 | B1 * | 3/2004 | Kato | 370/336 |
| 6,751,698 | B1 * | 6/2004 | Deneroff et al. | 710/317 |
| 6,778,548 | B1 * | 8/2004 | Burton et al. | 370/429 |
| 6,831,916 | B1 * | 12/2004 | Parthasarathy et al. | 370/359 |
| 7,000,055 | B1 * | 2/2006 | Robins et al. | 710/305 |
| 7,016,971 | B1 * | 3/2006 | Recio et al. | 709/233 |
| 7,050,468 | B2 * | 5/2006 | Seto et al. | 370/535 |
| 7,245,725 | B1 * | 7/2007 | Beard | 380/270 |
| 2001/0013080 | A1 * | 8/2001 | Kameyama et al. | 710/200 |
| 2002/0126689 | A1 * | 9/2002 | Redington | 370/442 |

OTHER PUBLICATIONS

Zhonghai et al. ("Flit admission in on-chip wormhole-switched networks with virtual channels", System-on-Chip, 2004, Proceedings 2004 International Symposium on Nov. 16-18, 2004, pp. 21-24.*
Zhonghai et al. ("Flit ejection in on-chip wormhole-switched networks with virtual channels", Norchip Conference, 2004, Proceedings Nov. 8-9, 2004, pp. 273-276.*

* cited by examiner

*Primary Examiner*—Chi H. Pham
*Assistant Examiner*—Tri H. Phan
(74) *Attorney, Agent, or Firm*—Blakely, Sokoloff, Taylor & Zafman LLP

(57) ABSTRACT

A system for carrying two channels of data over a single physical connection. In multi-node systems, data packets are divided into flits with flits from two channels being interleaved and carried by a single physical connection. Once the flits are transmitted, they are reassembled into packets in order to be carried by a processor bus. Controllers for the channel communicate to minimize "bubbles" observed during packet assembly by the processor bus. Thus, the data is transferred in two different types of resource sharing paradigms.

18 Claims, 2 Drawing Sheets

SYSTEM FOR SHARING CHANNELS BY INTERLEAVING FLITS

FIELD

The present invention relates to the sharing of channels in a data network and more particularly to the sharing of channels by interleaving in a multi-node network system.

BACKGROUND

In various kinds of communication systems, it has always been the aim to fully utilize the capabilities of every connection in order to increase the amount of information that can be carried without additional increase in equipment. Thus, even in analog systems, such as telephones, the multiplexing concept was developed so that multiple analog signals could be placed onto a single wire. By doing this, more than one telephone connection or other information connection could be made at the same time. While this is especially used in wired connections, the same technique applies to other types of connections such as radio links, optical links, etc.

In high speed digital equipment, the same goals remain. Especially in high speed processors and other computer components, it is desirable to completely utilize bandwidth while decreasing any latency in the data stream. Of particular interest are new multi-node systems which utilize a series of processors or nodes which generate or receive data and are connected through a network of interconnects. These interconnects may be routers, repeaters or switches and are used to transmit data from one node to the other. Examples of such multi-node systems include the Next Generation I/O (NGIO) system of Intel and the InfiniBand™ system. Such systems often use a virtual interface architecture to support data transfer between two memory regions, typically on different systems over one or more channels.

In systems of this type the data is typically carried in units called packets which are transferred between nodes. However, packets can also be divided into smaller units called flits (flow interface transfer units). Packets are sent among various channels. Among some channels such as processor buses, the packets are the smallest units which can be present. Among other channels of a more local nature, it is possible to transfer individual flits along the channels. However, it has been difficult to arrange data in such a fashion that it can be transferred easily from one resource sharing paradigm to another, that is between rules governing local channels as opposed to the rules governing the processor bus, without problems of wasted bandwidth or extra latency.

Attempts have been made to move more than a single data channel through an individual physical connection. A physical connection is typically a wire connection, but is also equally applicable to a radio link, optical link or other data connection. The concept of using a single connection for more than one channel is a well known concept and has been used for years in telephones and other analog systems where it is known as multiplexing. However, in digital systems this full use of resources is even more important in order to increase the speed of the device. Accordingly, it is important to fully utilize existing bandwidth and to avoid any increase in latency of the data.

BRIEF DESCRIPTION OF THE DRAWINGS

The foregoing and a better understanding of the present invention will become apparent from the following detailed description of example embodiments and the claims when read in connection with the accompanying drawings, all forming a part of the disclosure of this invention. While the foregoing and following written and illustrated disclosure focuses on disclosing example embodiments of the invention, it should be clearly understood that the same is by way of illustration and example only and that the invention is not limited thereto. The spirit and scope of the present invention are limited only by the terms of the appended claims.

The following represents brief descriptions of the drawings, wherein.

DETAILED DESCRIPTION

Figure 1:
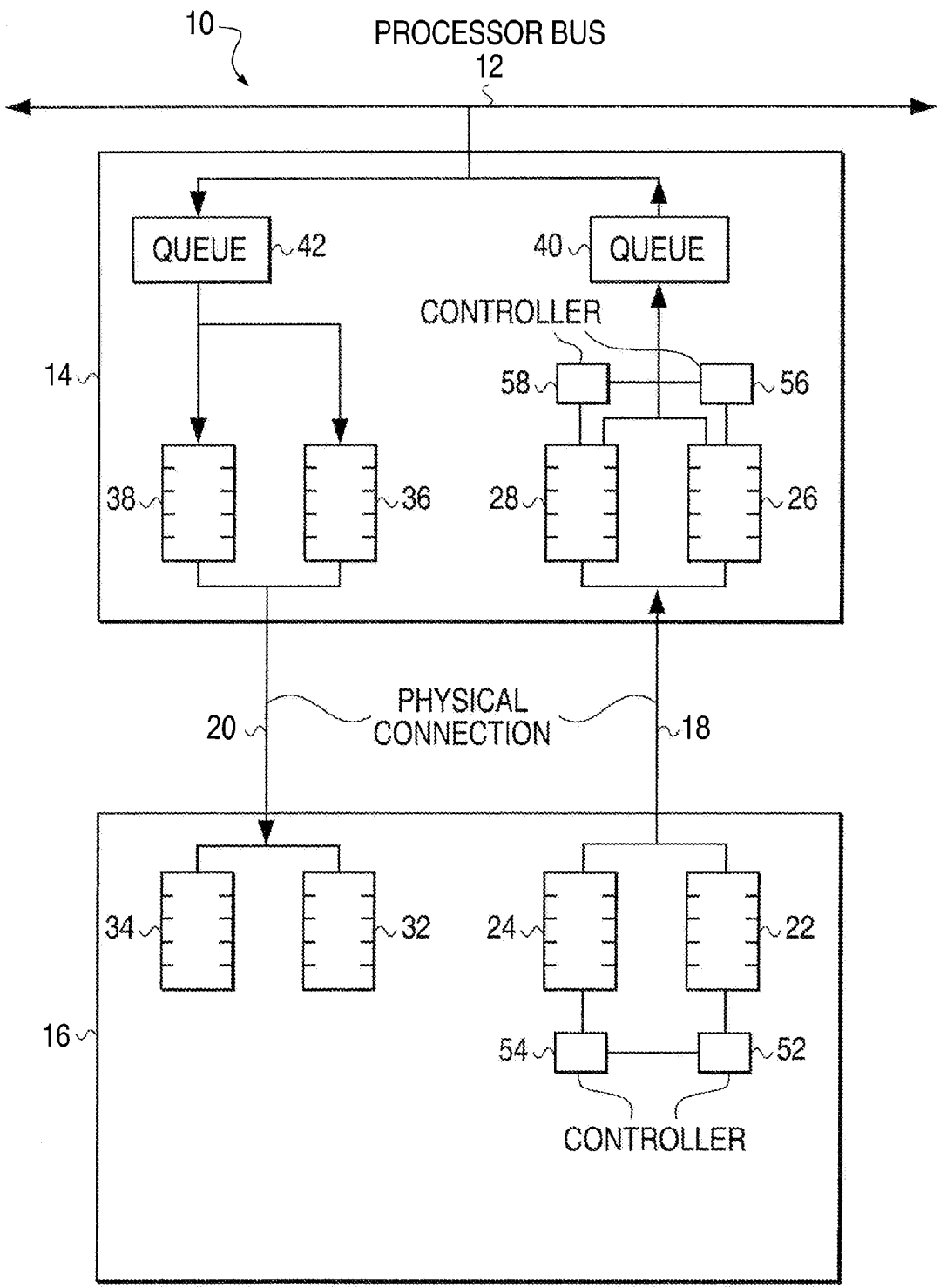
FIG. 1 is a schematic of an example embodiment according to the present invention.

Before beginning a detailed description of the subject invention, mention of the following is in order. When appropriate, like reference numerals and characters may be used to designate identical, corresponding or similar components in differing figure drawings. Further, in the detailed description to follow, example sizes/models/values/ranges may be given, although the present invention is not limited to the same. Still further, the clock and timing signal FIGS. are not drawn to scale, and instead, exemplary and critical time values are mentioned when appropriate. With regard to description of any timing signals, the terms assertion and negation may be used in an intended generic sense. More particularly, such terms are used to avoid confusion when working with a mixture of "active-low" and "active-high" signals, and to represent the fact that the invention is not limited to the illustrated/described signals, but could be implemented with a total/partial reversal of any of the "active-low" and "active-high" signals by a simple change in logic. More specifically, the terms "assert" or "assertion" indicate that a signal is active independent of whether that level is represented by a high or low voltage, while the terms "negate" or "negation" indicate that a signal is inactive. As a final note, well known power/ground connections to ICs and other components may not be shown within the FIGS. for simplicity of illustration and discussion, and so as not to obscure the invention. Further, arrangements may be shown in block diagram form in order to avoid obscuring the invention, and also in view of the fact that specifics with respect to implementation of such block diagram arrangements are highly dependent upon the platform within which the present invention is to be implemented, i.e., such specifics should be well within purview of one skilled in the art. Where specific details (e.g., circuits, flowcharts) are set forth in order to describe example embodiments of the invention, it should be apparent to one skilled in the art that the invention can be practiced without, or with variation of, these specific details. Finally, it should be apparent that differing combinations of hard-wired circuitry and software instructions can be used to implement embodiments of the present invention, i.e., the present invention is not limited to any specific combination of hardware and software.

The present invention is applicable for use with all types of data networks, I/O hardware adapters and chipsets, including follow-on chip designs which link together end stations such as computers, servers, peripherals, storage subsystems, and communication devices for data communications. Examples of such data networks may include a local area network (LAN), a wide area network (WAN), a campus area network (CAN), a metropolitan area network (MAN), a global area network (GAN), a wireless personal area network (WPAN), and a system area network (SAN), including newly developed computer networks using Next Generation I/O (NGIO), Future I/O (FIO), InifiBand™ and those networks including channel-based, switched fabric architectures which may become available as computer technology advances to provide scalable performance. LAN systems may include Ethernet, FDDI (Fiber Distributed Data Interface), Token Ring LAN, Asynchronous Transfer Mode (ATM) LAN, Fiber Channel, and Wireless LAN.

The switched fabric architectures discussed above generally consist of a network of multiple independent clustered nodes connected by point-to-point links. Each node may be an intermediate node, such as a switch/switch element, a repeater, and a router or an end-node within the network, such as a host system and an I/O unit (e.g., data servers, storage subsystems and network devices). Message data may be transmitted from source to destination, often through intermediate nodes.

Existing interconnect transport mechanisms, such as PCI (peripheral component interconnect) buses may be utilized to deliver message data to and from I/O devices, namely storage subsystems and network devices. However, PCI buses utilize a shared memory-mapped bus architecture that includes one or more shared I/O buses to deliver message data to and from storage subsystems and network devices. Shared I/O buses can pose serious performance limitations due to the bus arbitration required among storage and network peripherals as well as posing reliability, flexibility and scalability issues when additional storage and network peripherals are required. As a result, existing interconnect technologies have failed to keep pace with computer evolution any increased demands generated and burden imposed on server clusters, application processing, and enterprise computing created by the rapid growth of the Internet.

Emerging solutions to the shortcomings of existing PCI bus architecture are InfiniBand and its predecessor, Next Generation I/O (NGIO) which have been developed by Intel Corp. to provide a standards-based I/O platform that uses a switched fabric and separate I/O channels instead of a shared memory-mapped bus architecture for reliable data transfers between the end-nodes. Using NGIO or InfiniBand, a host system may communicate with one or more remote systems using a virtual interface architecture. This hardware and software may often be used to support data transfers between two memory regions, typically on different systems over one or more designated channels. Each host system using a virtual interface architecture may contain work queues formed in pairs including inbound and outbound queues in which requests, in the form of descriptors, are posted to describe data movement operation and location of data to remove for processing and/or transportation via a data network. Each host system may serve as a source system which initiates a message data transfer (message sentd operation) or a target system of a message passing operation (message receive operation). Requests for work (data movement operations such as message send/receive operations and remote direct memory access read/write operations) may be posted to work queues associated with a given network interface card. One or more channels between communication devices at a host system are between multiple host systems connected together directly or via a data network may be created and manage so that requested operations can be performed.

Attention is now directed to the drawings and particularly to FIG. 1 in which a data network 10 is shown including a processor bus 12. The bus is connected to node 14. This node is also connected to an additional node 16 by way of two physical connections 18 and 20. Node 16 includes at least four channels indicated as 22, 24, 32 and 34. Node 14 includes channels 26, 28, 36 and 38. In addition node 14 includes two queues 40 and 42.

As seen, each physical connection 18 and 20 connects two channels in adjoining nodes. It is possible to utilize a single physical connection to connect two channels by alternating or interleaving units of data such as packets or flits from the two channels. In some cases, the channels then are called virtual channels because they do not have a separate physical connection but share the connection. The physical connection can be shared on a flit-by-flit basis when desired, or packet-by-packet when possible. When the individual flits are received, they are reassembled into a single packet and stored in queue 40. Since the processor bus can only handle data in complete packets, it is necessary for the flits to be reassembled into a packet before being transferred onto the bus. Thus, it is said that the bus 12 and the physical connections 18 and 20 have different resource sharing paradigms, because data may move in flits or packets in connections 18 and 20, but only in packets in BUS 12.

While it is possible to merely follow a simple arbitration scheme to alternate the flits, "bubbles" often occur in the destination node. Bubbles are caused by the interleaving of flits from the channels as they are transferred across a physical connection. The interleaving causes the receiving interface to pause by one or more flits as it accumulates the flits of a particular channel. Unfortunately, the presence of such bubbles wastes critical bandwidth in what is considered to be a highly utilized resource. The receiver must waste the bandwidth or must buffer the packet to eliminate the bubbles before sending it onto the bus, which increases latency.

The present invention further improves on this system by including controllers 52, 54, 56 and 58 which are connected to channels 22, 24, 26 and 28, respectively. Similar controllers are also provided for the two channels 32-38.

Each of the controllers is in communication with another controller corresponding to the channel which shares the physical connection with its own channel. Thus, controllers 52 and 54 are in communication and controllers 56 and 58 are in communication. While neither of the controllers of a pair is actually in charge, information is transferred back and forth to let each other know whether flits are available for a transfer and whether the other end of the channel is able to receive more flits. By keeping each other apprized of its own situation, the controllers are able to alternate sending flits as long as certain situations do not occur. For example, if the flit being sent is the end of a packet, it is important to let the other channel controller know so that if a new packet does not arrive immediately, the other side can continue to send flits. Similarly, if there is no valid data in the channel to be transferred, the other channel controller is notified so that the other channel may utilize the connection completely. Another possible situation is if back pressure is received from the receiving end of the channel, that is, the receiver is full and cannot accept more data. Controllers at opposite ends of a channel are in communication also. That is, if controller 54 receives information from controller 58 that channel 28 cannot accept more flits from channel 24, controller 54 informs controller 52 of the situation so that channel 22 can fully utilize the physical connection by itself. The indication of backpressure can also be implemented in other manners. By utilizing this arbitration scheme, all of the characteristics of the strict alternation of flits are achieved. However, this scheme optimizes the transfer of an individual packet which allows the receiving channel to place the packet into the queue as soon as the packet flits are received without wasting bandwidth.

Each channel in the figure contains small transverse lines which indicate the individual flits that are stored therein. Each channel is some form of storage device such as a queue or register. In each pair of channels shown, one channel is dedicated to requests and the other to responses. However, any two channels can be utilized.

While the figure shows a particular arrangement of channels for transferring data between nodes, this system can also be used in any situation where two channels need to share a physical connection. It is only required that the controllers for the channels can interact and utilize the same arbitration scheme. Thus, the system can be used in any type of digital data transfer system where wasted band width is a problem. Also, it is possible to use the system where more than two channels are involved, as long as all channels are aware of the other channels situation and all utilize the same arbitration scheme to decide who can send in the following flit. This system has been shown as having controllers which cooperate but with neither controller actually in charge. It would also be possible to utilize a scheme where one channel is in charge and controls the other, based on information from both channels. However, the system is most effectively used where data is being transferred from one type of resource sharing paradigm to another, such as where the flit-interleaving system is in communication with a packet-only processor bus.

Figure 2:
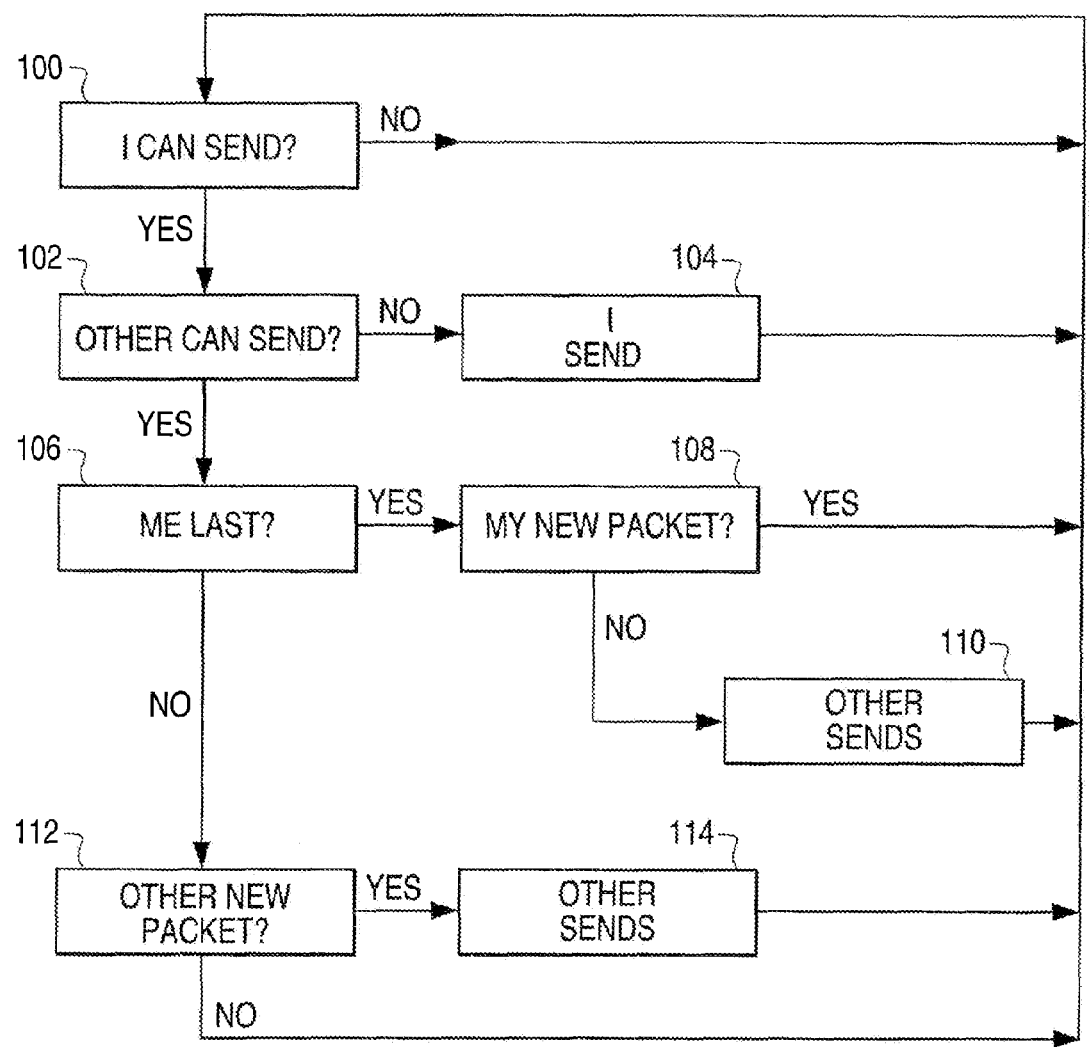
FIG. 2 is a flowchart of an example embodiment according to the present invention.

FIG. 2 shows a flow chart which may be utilized as the arbitration scheme by the controller. Other schemes could also be used long as they take account of the movement of data in both channels and prevent the formation of bubbles.

It is assumed that two controllers are connected to a single channel. The flow chart indicates whether the first (I or me) sends data or whether the second (other) sends data. At the beginning step 100, the first controller determines whether it has data to send. If it does not, it then merely loops back and repeats this question until it has data to send. When it does have data to send, it then determines whether the other controller has data to send in step 102. If the other controller has no data, the first controller proceeds to send data by itself in step 104. However, if the other controller also has data, a procedure must be implemented in order to determine who sends next. This starts in step 106 where it is determined if the first controller was the last one to send data. If it was the last to send, it then determines whether it is starting to send a new packet or not in step 108. If it is not sending a new packet then the second controller sends data as indicated in step 110. Thus, in this situation, the two controllers alternate data. If the second controller was the last one to send data so that the answer to step 106 is no, step 112 then determines whether the second controller has a new packet. If not, the procedure returns to the top. However, if the other controller has a new packet, the other controller sends data in step 114.

Other arbitration schemes are possible. If more than two channels are using the same physical connection, the scheme must be enlarged to take account of all of the other channels. Also, if the controllers are set up so that one controller acts as a master, the scheme must be adjusted so that the master receives all of the information and makes all the decisions and merely sends an enabling signal to the other controllers.

In concluding, reference in the specification to "one embodiment", "an embodiment", "example embodiment", etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments. Furthermore, for ease of understanding, certain method procedures may have been delineated as separate procedures; however, these separately delineated procedures should not be construed as necessarily order dependent in their performance, i.e., some procedures may be able to be performed in an alternative ordering, simultaneously, etc.

This concludes the description of the example embodiments. Although the present invention has been described with reference to a number of illustrative embodiments thereof, it should be understood that numerous other modifications and embodiments can be devised by those skilled in the art that will fall within the spirit and scope of the principles of this invention. More particularly, reasonable variations and modifications are possible in the component parts and/or arrangements of the subject combination arrangement within the scope of the foregoing disclosure, the drawings and the appended claims without departing from the spirit of the invention. In addition to variations and modifications in the component parts and/or arrangements, alternative uses will also be apparent to those skilled in the art.

What is claimed is:

1. An apparatus, comprising:
    a first node including a first end of a first channel and a first end of a second channel;
    a second node including a second end of a first channel and a second end of a second channel;
    a pysical connection joining said first node and said second node through which signals of both said first channel and said second channel are carried; and
    a first controller connected to said first end of said first channel and a second controller connected to said first end of said second channel, said first controller and said second controller being in communication and one of said first and second channels transfers flits on the physical connection, in response to determining that a flit being transferred by the other channel is the end of a packet.

2. The apparatus of claim 1, wherein:
    said first controller and said second controller controlling transferring data from one of said two channels through said physical connection in response to determining that valid data is unavailable in the other channel to be transferred.

3. The apparatus according to claim 1, further comprising a third controller connected to the second end of the first channel and a fourth controller connected to the second end of the second channel, said third and fourth controllers being in communication with each other and obtaining information on whether the second ends of said two channels can accept more data.

4. The apparatus according to claim 3, said first controller and said third controller being in communication and said second controller and said fourth controller being in communication, said first and second controllers controlling the interleaving of data further based on said information.

5. The apparatus according to claim 1, said second node further comprising a queue for receiving data packets from said second end of said first channel and said second end of said second channel and for delivering said packets to a processor bus.

6. The apparatus according to claim 5, wherein said processor bus carries packets and said physical connection carries flits.

7. The apparatus according to claim 1, wherein said first and second controllers controlling the interleaving of data further based on whether the first and second channels receives back pressure.

8. The apparatus according to claim 7, wherein one of said first and second controllers transfers data across said physical connection, in response to determining that the channel connecting to the other controller receives back pressure.

9. A method, comprising:
  determining availability of valid data in each of at least two channels, wherein said at least two channels share a physical connection to transfer data between a first node and a second node; and
  transferring flits from a channel across the physical connection, in response to determining that a flit being transferred by the other channel is the end of a packet.

10. The method of claim 9, further comprising:
  determining backpressure from a receiver of each channel; and
  transferring flits from one of said at least two channels along the physical connection in response to determining that valid data is unavailable in the other channel of said at least two channels based on said backpressure.

11. The method according to claim 9, further comprising reforming said flits into packets at the other end of said channels.

12. The method according to claim 11, further comprising storing said reformed packets in queues for transfer to a processor bus.

13. The method according to claim 12, wherein said processor bus transfers data in a different type of resource sharing paradigm than said physical connection.

14. The method according to claim 9, further comprising transferring said flits from each channel across the physical connection, in response to determining that the other channel is receiving backpressure from the receiver.

15. A system comprising:
  a first node:
  a second node:
  at least one physical connection connecting said first node to said second node;
  a processor bus connected to said second node;
  a first data channel and a second data channel each having a first end in said first node and a second end in said second node, and both channels being carried by said physical connection; and
  said channels carrying data packets divided into flits, wherein one of said first and second data channels transfers flits on the physical connection, in response to determining that a flit being sent by the other data channel is the end of a packet.

16. The system of claim 15, further comprising:
  flits from one of the two data channels being transferred in said physical connection when there is no flit available in the other data channel for a transfer.

17. The system according to claim 15, wherein flits are interleaved further based on whether a receiving end of each channel is able to receive more flits.

18. The system according to claim 17, wherein one of said first and second data channels utilizes the physical connection to transfer flits, in response to determining that the receiving end of the other data channel is unable to receive more flits.

* * * * *